US011409288B2

(12) United States Patent
Li et al.

(10) Patent No.: US 11,409,288 B2
(45) Date of Patent: Aug. 9, 2022

(54) LANE CHANGING METHOD, DEVICE FOR DRIVERLESS VEHICLE AND COMPUTER-READABLE STORAGE MEDIUM

(71) Applicant: Baidu Online Network Technology (Beijing) Co., Ltd, Beijing (CN)

(72) Inventors: Hongye Li, Beijing (CN); Kuan Zhang, Beijing (CN); Huaizhu Tang, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 247 days.

(21) Appl. No.: 16/791,405

(22) Filed: Feb. 14, 2020

(65) Prior Publication Data

US 2020/0310428 A1 Oct. 1, 2020

(30) Foreign Application Priority Data

Mar. 28, 2019 (CN) .......................... 201910244316.8

(51) Int. Cl.
*G06N 20/00* (2019.01)
*B60W 30/12* (2020.01)
(Continued)

(52) U.S. Cl.
CPC .......... *G05D 1/0088* (2013.01); *B60W 30/12* (2013.01); *B60W 30/18163* (2013.01);
(Continued)

(58) Field of Classification Search
CPC ............... G05D 1/0088; G05D 1/0214; G05D 2201/0213; G05D 1/0289; B60W 30/12;
(Continued)

(56) References Cited

U.S. PATENT DOCUMENTS

| 2017/0082452 A1 | 3/2017 | Sumizawa |
| 2018/0043935 A1 | 2/2018 | Hashimoto et al. |

(Continued)

FOREIGN PATENT DOCUMENTS

| CN | 103802829 A | * | 5/2014 |
| CN | 103802829 A | | 5/2014 |

(Continued)

OTHER PUBLICATIONS

English Translation_CN103802829A (Year: 2014).*

(Continued)

*Primary Examiner* — Peter D Nolan
*Assistant Examiner* — Ashley L Redhead, Jr.
(74) *Attorney, Agent, or Firm* — Akerman LLP

(57) ABSTRACT

A lane changing method, device for a driverless vehicle and a computer-readable storage medium are provided. The lane changing method includes: determining candidate lanes, to which a lane changing is to be performed, based on a travelling intention of a main vehicle; screening the candidate lanes based on lane changing conditions of the candidate lanes; selecting, from the screened candidate lanes, a target lane, to which the lane changing of the main vehicle is to be performed; determining whether the lane changing of the main vehicle from a current lane to the target lane is safe; and performing the lane changing, if the lane changing is determined to be safe.

19 Claims, 7 Drawing Sheets

(51) Int. Cl.
  *B60W 50/00* (2006.01)
  *G06N 5/04* (2006.01)
  *G05D 1/00* (2006.01)
  *B60W 60/00* (2020.01)
  *B60W 30/18* (2012.01)
  *G05D 1/02* (2020.01)

(52) U.S. Cl.
  CPC ........ *B60W 50/00* (2013.01); *B60W 60/0015* (2020.02); *G05D 1/0214* (2013.01); *G06N 5/04* (2013.01); *G06N 20/00* (2019.01); *B60W 2050/0022* (2013.01); *B60W 2554/4041* (2020.02); *B60W 2554/4042* (2020.02); *B60W 2554/801* (2020.02); *B60W 2554/802* (2020.02); *B60W 2554/804* (2020.02); *B60W 2720/10* (2013.01); *G05D 2201/0213* (2013.01)

(58) Field of Classification Search
  CPC ........... B60W 30/18163; B60W 50/00; B60W 60/0015; B60W 2050/0022; B60W 2554/4041; B60W 2554/4042; B60W 2554/801; B60W 2554/802; B60W 2554/804; B60W 2720/10; B60W 60/0011; B60W 30/08; B60W 40/06; B60W 40/105; B60W 50/10; B60W 2552/50; G06N 5/04; G06N 20/00; G01C 21/3407; G08G 1/167; B60Y 2300/08; B60Y 2300/18166
  See application file for complete search history.

(56) References Cited

U.S. PATENT DOCUMENTS

| | | | |
|---|---|---|---|
| 2019/0023268 A1 | 1/2019 | Pink et al. | |
| 2019/0382019 A1* | 12/2019 | Abe | G08G 1/167 |
| 2020/0139973 A1* | 5/2020 | Palanisamy | G06N 5/046 |

FOREIGN PATENT DOCUMENTS

| | | | |
|---|---|---|---|
| CN | 106527452 A | | 3/2017 |
| CN | 106527452 A | * | 3/2017 |
| CN | 107985189 A | | 5/2018 |
| CN | 108305477 A | | 7/2018 |
| CN | 108961839 A | | 12/2018 |
| JP | H09-221052 A | | 8/1997 |
| JP | 2003-025868 A | | 1/2003 |
| JP | 2013186868 A | | 9/2013 |
| JP | 2017117079 A | | 6/2017 |
| JP | 2017117080 A | | 6/2017 |
| JP | 2018-025976 A | | 2/2018 |
| JP | 2018025993 A | | 2/2018 |
| JP | 6325670 B2 | | 5/2018 |
| JP | 2018-203034 A | | 12/2018 |
| WO | 2015/052865 A1 | | 4/2015 |
| WO | 2015/190212 A1 | | 12/2015 |

OTHER PUBLICATIONS

English Translation_CN106527452A (Year: 2017).*
Notice of Reasons for Refusal dated Mar. 2, 2021 in connection with Japanese Patent Application No. 2020-027728.
Notice of Opinion Submission dated Mar. 12, 2021 in connection with Korean Patent Application No. 10-2020-0021595.
Pierson et al., "Navigating Congested Environments with Risk Level Sets," 2018 IEEE International Conference.
First Office Action dated Apr. 14, 2020 issued in connection with Chinese Application No. 201910244316.8.
Search Report dated Apr. 7, 2020 issued in connection with Chinese Application No. 201910244316.8.
Extended European Search Report dated Sep. 21, 2020 issued in connection with corresponding European Patent Application No. 20157889.5.
Notice of Reasons for Refusal dated Nov. 18, 2021 in connection with Japanese Patent Application No. 2020-027728.

* cited by examiner

| calculating the security distance between each obstacle on the target lane and the main vehicle, the security distance including a lateral security distance and a longitudinal security distance | ⟋S201 |

↓

| determining that the distance between the obstacle and the main vehicle is greater than the security distance, in a case that the lateral distance between the obstacle and the main vehicle is greater than the lateral security distance, and the longitudinal distance between the obstacle and the main vehicle is greater than the longitudinal security distance | ⟋S202 |

FIG. 8

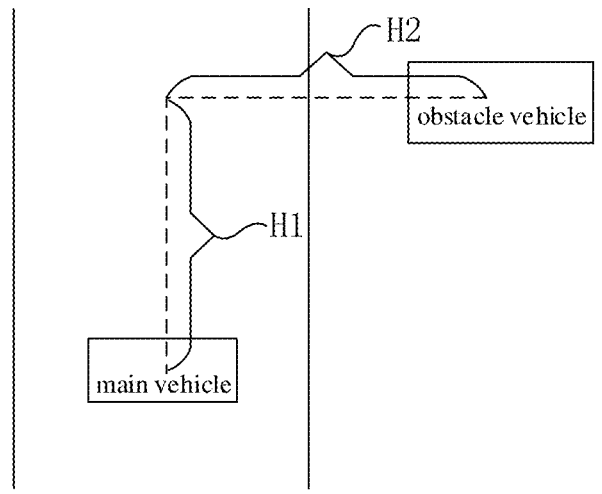

FIG. 9

| calculating the distance between each obstacle on the target lane and the main vehicle in each frame of acquired continuous multiple frames, the distance including a lateral distance and a longitudinal distance | ⟋S310 |

↓

| determining whether the distance is not reduced | ⟋S320 |

FIG. 10

LANE CHANGING METHOD, DEVICE FOR DRIVERLESS VEHICLE AND COMPUTER-READABLE STORAGE MEDIUM

CROSS-REFERENCE TO RELATED APPLICATION

This application claims priority to Chinese Patent Application No. 201910244316.8, filed on Mar. 28, 2019, which is hereby incorporated by reference in its entirety.

TECHNICAL FIELD

The present application relates to a field of driverless vehicle technology, and in particular, to a lane changing method, and device for a driverless vehicle and a computer-readable storage medium.

BACKGROUND

In the existing technology, a travelling route of a driverless vehicle system is planned by a planning module. For example, in the planned driving route, a lane changing of the driverless vehicle should be performed, when the vehicle travels to a certain position in the current lane. However, in the planned driving route, positions where the lane changing of the vehicle is to be performed is usually planned according to the driving destination. No safe and reasonable lane changing decisions is made through comprehensive determination based on information, such as road conditions and the like. In an actual road situation scenario, in a case that a target lane to which the lane changing is performed is blocked, it is impossible to follow the planned driving route. Therefore, it is not possible to ensure that the lane changing of the driverless vehicle can be safely and smoothly performed only through the guidance of the driving route.

SUMMARY

A lane changing method, and device for a driverless vehicle and a computer-readable storage medium are provided according to embodiments of the present application, so as to at least solve the above technical problems in the existing technology.

In a first aspect, a lane changing method for a driverless vehicle is provided according to an embodiment of the present application, which includes:

determining candidate lanes, to which a lane changing is to be performed, based on a travelling intention of a main vehicle;

screening the candidate lanes based on lane changing conditions of the candidate lanes;

selecting, from the screened candidate lanes, a target lane, to which the lane changing of the main vehicle is to be performed;

determining whether the lane changing of the main vehicle from a current lane to the target lane is safe; and performing the lane changing, if the lane changing is determined to be safe.

In one implementation, the screening the candidate lanes based on lane changing conditions of the candidate lanes includes:

ranking the candidate lanes with a machine learning model, wherein the candidate lanes with high security risk and/or poor trafficability are ranked behind; and screening out at least one of the candidate lanes ranked behind.

In one implementation, a characteristic of the machine learning model includes: at least one of a kinematic parameter of an obstacle, a kinematic parameter of the main vehicle, a distance between the obstacle and the main vehicle, and a state of the obstacle, and wherein the kinematic parameter includes at least one of a speed and a position; the state of the obstacle includes at least one of a size of the obstacle, an orientation of the obstacle, and a category of the obstacle; and the category of the obstacle includes at least one of a long-term stationary category and a short-term stationary category.

In one implementation, the selecting, from the screened candidate lanes, a target lane, to which the lane changing of the main vehicle is to be performed includes:

calculating lane changing cost values for each of the screened candidate lanes;

performing a weighted summation on the lane changing cost values for each lane; and selecting the target lane, to which the lane changing of the main vehicle is to be performed, based on weighted summation values of the screened candidate lanes.

In one implementation, the lane changing cost values include at least two of a blocking cost value, a reference line cost value, and a lane keeping cost value.

In one implementation, the calculating lane changing cost values for each lane of the screened candidate lanes includes:

determining the blocking cost value according to at least one of a kinematic parameter of an obstacle, a kinematic parameter of the main vehicle, a distance between the obstacle and the main vehicle, and a state of the obstacle, wherein the kinematic parameter includes at least one of a speed and a position; the state of the obstacle includes at least one of a size of the obstacle, an orientation of the obstacle, and a category of the obstacle; and the category of the obstacle includes at least one of a long-term stationary category and a short-term stationary category.

In one implementation, the calculating lane changing cost values for each lane of the screened candidate lanes includes:

determining the reference line cost value according to a length of a lane changing section corresponding to a current position of the main vehicle.

In one implementation, the calculating lane changing cost values for each lane of the screened candidate lanes includes:

determining the lane keeping cost value based on the number of lane changing from the current lane to the candidate lane and/or the travelling intention of the main vehicle.

In one implementation, the performing a weighted summation on the lane changing cost values for each lane includes:

adjusting a weight corresponding to each of the lane changing cost values;

setting the weight corresponding to each of the lane changing cost values according to the adjusted result; and performing the weighted summation on the lane changing cost values according to the set weights.

In one implementation, the determining whether the lane changing of the main vehicle from the current lane to the target lane is safe includes:

performing a single frame trajectory determination according to an acquired single frame, wherein the single frame trajectory determination includes: determining whether a distance between each obstacle on the target lane, to which the lane changing is to be performed, and the main vehicle is greater than a security distance;

performing a multi-frame trend determination according to acquired multiple frames, wherein the multi-frame trend determination includes: determining whether a distance between each obstacle on the target lane and the main vehicle is not reduced; and determining that the lane changing is safe, if the distance between each obstacle on the target lane and the main vehicle is greater than the security distance, and the distance between each obstacle on the target lane and the main vehicle is not reduced.

In one implementation, the determining whether a distance between each obstacle on the target lane and the main vehicle is not reduced includes:

calculating the distance between each obstacle on the target lane and the main vehicle in each frame of acquired continuous multiple frames, the distance including a lateral distance and a longitudinal distance; and determining whether the distance is not reduced.

In one implementation, the determining whether a distance between each obstacle on the target lane, to which the lane changing is to be performed, and the main vehicle is greater than a security distance includes:

calculating the security distance between each obstacle on the target lane and the main vehicle, the security distance including a lateral security distance and a longitudinal security distance; and determining that the distance between the obstacle and the main vehicle is greater than the security distance, in a case that the lateral distance between the obstacle and the main vehicle is greater than the lateral security distance, and the longitudinal distance between the obstacle and the main vehicle is greater than the longitudinal security distance.

In one implementation, the method further includes:

re-determining whether the lane changing of the main vehicle from the current lane to the target lane is safe after an acquisition of a next frame, if it is determined that the lane changing is not safe at a current time.

In one implementation, before performing the lane changing, if the lane changing is determined to be safe, the method further includes:

adjusting a speed of the main vehicle to adapt the speed of the main vehicle to a speed of an obstacle vehicle on the target lane, in a case that the lane changing is determined to be safe.

In a second aspect, a lane changing device for a driverless vehicle is provided according to an embodiment of the present application, which includes:

a candidate lane determining unit, configured to determine candidate lanes, to which a lane changing is to be performed, based on a travelling intention of a main vehicle;

a screening unit, configured to screen the candidate lanes based on lane changing conditions of the candidate lanes;

a lane selecting unit, configured to select, from the screened candidate lanes, a target lane, to which the lane changing of the main vehicle is to be performed;

a security determining unit, configured to determine whether the lane changing of the main vehicle from a current lane to the target lane is safe; and a lane changing performing unit, configured to perform the lane changing, if the lane changing is determined to be safe.

In one implementation, the screening unit is further configured to:

rank the candidate lanes with a machine learning model, wherein the candidate lanes with high security risk and/or poor trafficability are ranked behind; and screen out at least one of the candidate lanes ranked behind.

In one implementation, a parameter of the machine learning model includes: at least one of a kinematic parameter of an obstacle, a kinematic parameter of the main vehicle, a distance between the obstacle and the main vehicle, and a state of the obstacle, wherein the kinematic parameter includes at least one of a speed and a position; the state of the obstacle includes at least one of a size of the obstacle, an orientation of the obstacle, and a category of the obstacle; and the category of the obstacle includes at least one of a long-term stationary category and a short-term stationary category.

In one implementation, the lane selecting unit includes:

a cost value calculating sub-unit, configured to calculate lane changing cost values for each lane of the screened candidate lanes;

a weighted summation calculating sub-unit, configured to perform a weighted summation on the lane changing cost values for each lane; and a lane selecting sub-unit, configured to select the target lane, to which the lane changing of the main vehicle is to be performed, based on weighted summation values of the screened candidate lanes.

In one implementation, the lane changing cost values include at least two of a blocking cost value, a reference line cost value, and a lane keeping cost value.

In one implementation, the cost value calculating sub-unit is further configured to:

determine the blocking cost value according to at least one of a kinematic parameter of an obstacle, a kinematic parameter of the main vehicle, a distance between the obstacle and the main vehicle, and a state of the obstacle, wherein the kinematic parameter includes at least one of a speed and a position; the state of the obstacle includes at least one of a size of the obstacle, an orientation of the obstacle, and a category of the obstacle, and the category of the obstacle includes at least one of a long-term stationary category and a short-term stationary category.

In one implementation, the cost value calculating sub-unit is further configured to:

determine the reference line cost value according to a length of a lane changing section corresponding to a current position of the main vehicle.

In one implementation, the cost value calculating sub-unit is further configured to:

determine the lane keeping cost value based on the number of lane changing from the current lane to the candidate lane and/or the travelling intention of the main vehicle.

In one implementation, the weighted summation calculating sub-unit is further configured to:

adjust a weight corresponding to each of the lane changing cost values;

set the weight corresponding to each of the lane changing cost values according to the adjusted result; and perform the weighted summation on the lane changing cost values according to the set weights.

In one implementation, the security determining unit includes:

a single frame determination sub-unit, configured to perform a single frame trajectory determination according to an acquired single frame, the single frame trajectory determination includes: determining whether a distance between each obstacle on the target lane, to which the lane changing is to be performed, and the main vehicle is greater than a security distance;

a multi-frame determination sub-unit, configured to perform a multi-frame trend determination according to acquired multiple frames, wherein the multi-frame trend determination includes: determining whether a distance between each obstacle on the target lane and the main vehicle is not reduced; and a determining sub-unit, configured to determine that the lane changing is safe, if the distance between each obstacle on the target lane and the main vehicle is greater than the security distance, and the distance between each obstacle on the target lane and the main vehicle is not reduced.

In one implementation, the multi-frame determination sub-unit is further configured to:

calculate the distance between each obstacle on the target lane and the main vehicle in each frame of acquired continuous multiple frames, the distance including a lateral distance and a longitudinal distance; and determine whether the distance is not reduced.

In one implementation, the single frame determination sub-unit is further configured to:

calculate the security distance between each obstacle on the target lane and the main vehicle, the security distance including a lateral security distance and a longitudinal security distance; and determine that the distance between the obstacle and the main vehicle is greater than the security distance, in a case that the lateral distance between the obstacle and the main vehicle is greater than the lateral security distance, and the longitudinal distance between the obstacle and the main vehicle is greater than the longitudinal security distance.

In one implementation, the security determining unit is further configured to:

re-determine whether the lane changing of the main vehicle from the current lane to the target lane is safe after an acquisition of a next frame, if it is determined that the lane changing is not safe at a current time.

In one implementation, the device further includes a lane changing preparation unit, configured to:

adjust a speed of the main vehicle to adapt the speed of the main vehicle to a speed of an obstacle vehicle on the target lane, in a case that the lane changing is determined to be safe.

In a third aspect, a lane changing device for a driverless vehicle is provided according to an embodiment of the present application. The functions of the device may be implemented by hardware, or by hardware executing corresponding software. The hardware or software includes one or more modules corresponding to the above functions.

In a possible embodiment, the device includes a processor and a storage, wherein the storage is configured to store a program for supporting the above lane changing method executed by the lane changing device, and the processor is configured to execute the program stored in the storage. The lane changing device further includes a communication interface configured for communication between the lane changing device and another device or communication network.

In a fourth aspect, a computer-readable storage medium is provided according to an embodiment of the present application, which stores computer software instructions. The computer software instructions include programs involved in execution of the above lane changing method.

One of the above technical solutions has the following advantages or beneficial effects: a safe and reasonable lane changing decision can be made through comprehensive determination based on information such as lane changing conditions, to select the lane that is most suitable for travelling, and to perform the lane changing at a safe time, thereby greatly reducing accidents and ensuring that the lane changing of the driverless vehicle is safely and smoothly performed.

The above summary is for the purpose of the specification only and is not intended to be limiting in any way. In addition to the illustrative aspects, embodiments, and features described above, further aspects, embodiments, and features of the present application will be readily understood by reference to the drawings and the following detailed description.

BRIEF DESCRIPTION OF THE DRAWINGS

In the drawings, unless otherwise specified, identical reference numerals will be used throughout the drawings to refer to identical or similar parts or elements. The drawings are not necessarily drawn to scale. It should be understood that these drawings depict only some embodiments disclosed in accordance with the present application and are not to be considered as limiting the scope of the present application.

FIG. 8 is a flowchart of a single frame trajectory determination of a lane changing method for a driverless vehicle according to an embodiment of the present application.

FIG. 9 is a schematic diagram of a security distance of a lane changing method for a driverless vehicle according to an embodiment of the present application.

FIG. 10 is a flowchart of a multi-frame trend determination of a lane changing method for a driverless vehicle according to an embodiment of the present application.

DETAILED DESCRIPTION OF THE EMBODIMENTS

In the following, only certain exemplary embodiments are briefly described. As those skilled in the art would realize, the described embodiments may be modified in various different ways, all without departing from the spirit or scope of the present application. Accordingly, the drawings and description are to be regarded as illustrative in nature and not restrictive.

Figure 1:
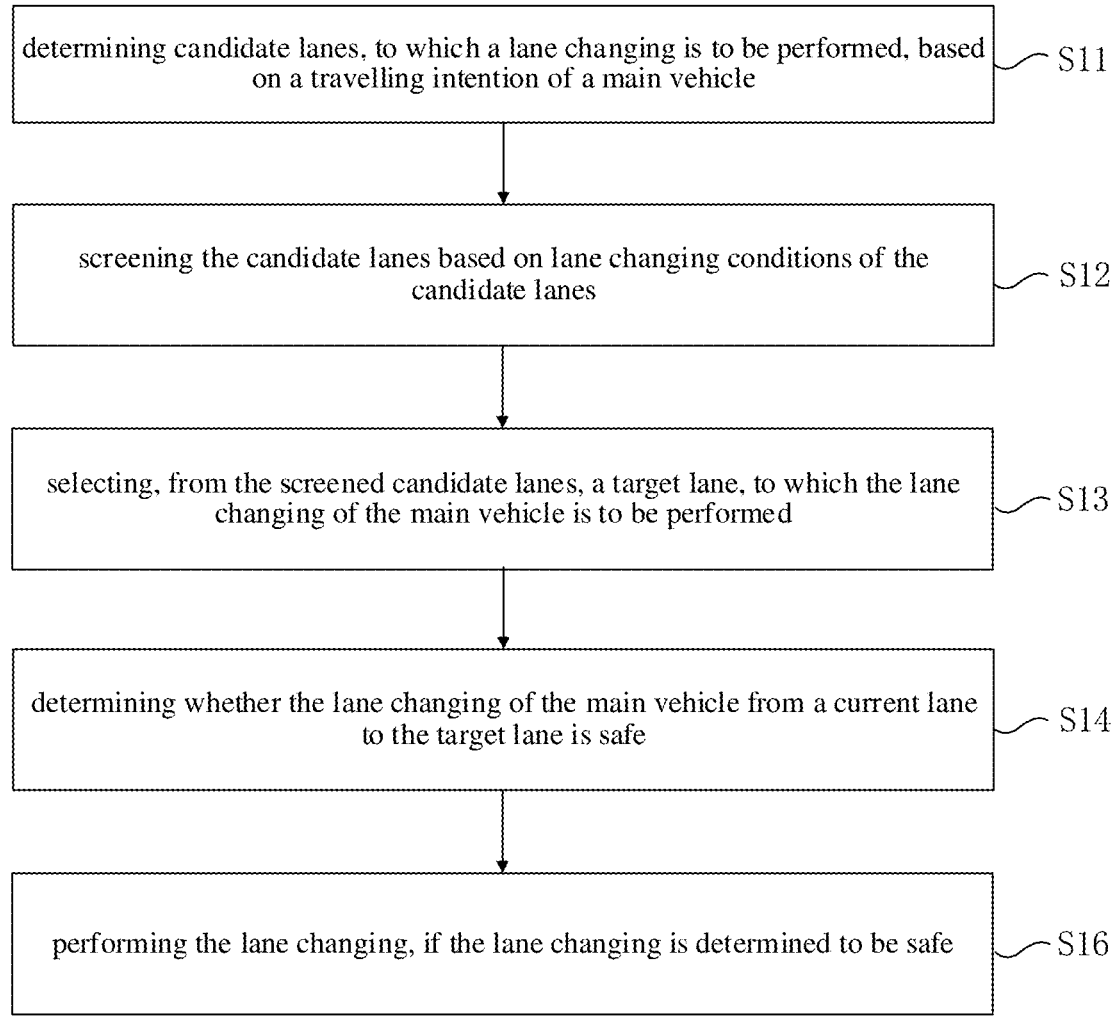
FIG. 1 is a flowchart of a lane changing method for a driverless vehicle according to an embodiment of the present application.

FIG. 1 is a flowchart of a lane changing method for a driverless vehicle according to an embodiment of the present application. A lane changing method for a driverless vehicle is provided according to an embodiment of the present application, as shown in FIG. 1. The method includes:

S11, determining candidate lanes, to which a lane changing is to be performed, based on a travelling intention of a main vehicle;

S12, screening the candidate lanes based on lane changing conditions of the candidate lanes;

S13, selecting, from the screened candidate lanes, a target lane, to which the lane changing of the main vehicle is to be performed;

S14, determining whether the lane changing of the main vehicle from a current lane to the target lane is safe; and S16, performing the lane changing, if the lane changing is determined to be safe.

Generally, during a driverless vehicle is travelling, a lane changing is performed at a certain position of the current lane according to the plan path. However, various complicated situations in the actual road situation scenario cannot be solved only based on the plan path. For example, a driverless vehicle is not able to cope with a situation such as the blocked lane. Therefore, during the driverless vehicle is travelling, a safe and reasonable lane changing decision needs to be made through a comprehensive determination according to the specific situation in real time.

Specifically, in S11, firstly, a candidate lane to which the lane changing can be performed at the current time is determined according to the plan path of the main vehicle. For example, in a two-way eight-lane road segment, according to the plan path of the main vehicle, four lanes in the travelling direction of the main vehicle all may be candidate lanes to which the lane changing can be performed. In this case, the four lanes in the travelling direction of the main vehicle can be determined as the candidate lanes. In S12, the candidate lanes are initially screened according to the lane changing conditions of the candidate lanes, and the lanes with poor conditions are screened out. For example, the lanes with high security risks and poor trafficability are screened out. In S13, a lane most suitable for travelling is selected from the screened candidate lanes as a target lane, to which the lane changing of the main vehicle may be performed. In S14, it is determined whether the target lane selected in S13 is safe. In S16, in a case that the target lane selected in S13 is safe, the driverless vehicle is controlled to perform the lane changing to the target lane.

In S11, the candidate lanes may be determined according to a local navigation strategy, and a length of the lane changing section may be determined. Specifically, the local navigation strategy can be at a road level. By using the local navigation strategy, roads from the start point to the end point can be determined, and a crossing is determined, at which the driverless vehicle turns right or left. For example, the driverless vehicle travels firstly on the Zhongguancun East Road, and then on the North Fourth Ring Road. There is a right turn intersection on the Zhongguancun East Road, at which the driverless vehicle needs to turn right. In the above example, it is determined whether the driverless vehicle goes straight or steers at the intersection through the local navigation strategy, and it is determined which lane is the target lane within the road. In another example, when the driverless vehicle passes the intersection, the local navigation strategy may include determining: whether the driverless vehicle turns right at the intersection, and how many right-turning lanes there are; whether the driverless vehicle goes straight, and how many straight lanes there are; similarly, the local navigation strategy may further include determining whether the driverless vehicle turns left, such as whether the driverless vehicle needs to be changed to the left turn lane, and the like.

Figure 2:
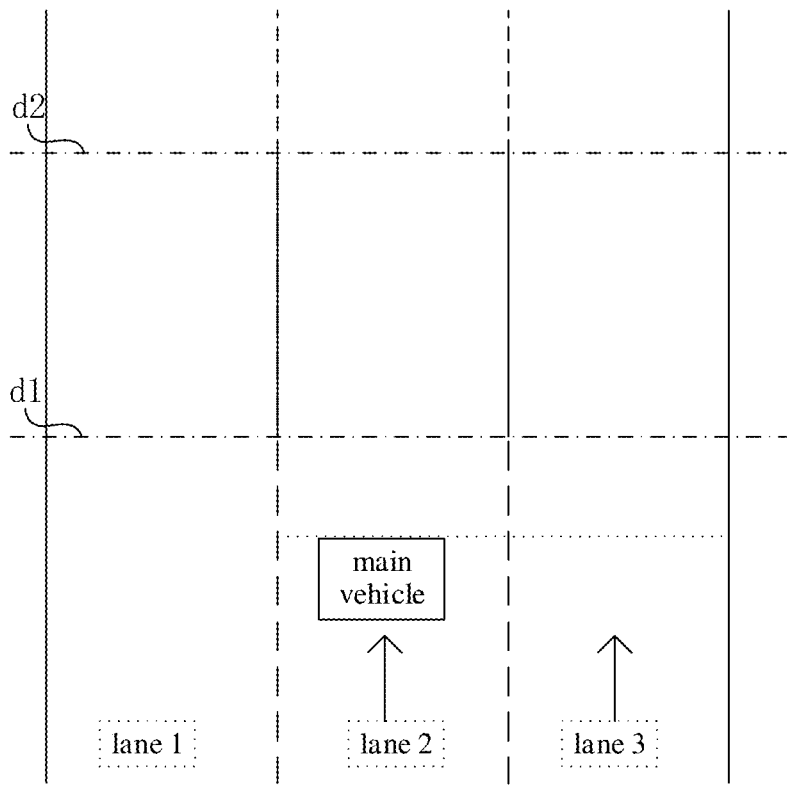
FIG. 2 is a schematic diagram of a lane changing scenario of a lane changing method for a driverless vehicle according to an embodiment of the present application.

FIG. 2 is a schematic diagram of a lane changing scenario of a driverless vehicle according to a lane changing method for a driverless vehicle according to an embodiment of the present application. In another example, as shown in FIG. 2, the driverless vehicle may go straight on both lane 2 and lane 3. A road area drawn with a solid line is between two dash dot lines labelled with d1 and d2, and a road area drawn with a dashed line is also in front of this road area drawn a solid. The lane changing can be performed in the road area drawn with the dashed line, but the lane changing cannot be performed in the road area drawn with the solid line. In a case that the driverless vehicle goes straight, the lane changing can be performed at a position above the dash dot line labelled with d2. In other words, in a case that the driverless vehicle goes straight, the lane changing can be performed in the two road areas drawn with dashed lines. Since there still is a chance to perform the lane changing of the main vehicle in the front, the main vehicle can continue to go straight at the current moment, and it is unnecessary to perform the lane changing of the main vehicle in a hurry. However, in a case that the main vehicle's plan path is that the main vehicle should turn right at this time, it is necessary to perform the lane changing of the main vehicle as soon as possible. The local navigation strategy may determine which lanes are the candidate lanes to which the lane changing can be performed at the current time based on the plan path of the main vehicle.

In one embodiment, the screening the candidate lanes based on lane changing conditions of the candidate lanes includes:

ranking the candidate lanes with a machine learning model, wherein the candidate lanes with high security risk and/or poor trafficability are ranked behind; and screening out at least one of the candidate lanes ranked behind.

After the candidate lanes are determined according to the local navigation strategy, the candidate lanes are pre-pruned, that is, the candidate lanes are screened initially. The pre-pruning includes cutting off from the candidate lanes a lane to which it is impossible to perform the lane changing. Specifically, the candidate lanes are ranked. The candidate lanes with high security risks and/or poor trafficability are ranked behind, and at least one candidate lane ranked behind are screened out. For example, three candidate lanes are determined according to the local navigation strategy. The three candidate lanes are pre-ranked according to the lane changing conditions, and the lane with the worst condition is cut off. A lane with the poor condition may include a lane with the high security risk and/or poor trafficability. In one embodiment, the pre-pruning can only cut off one lane. In another embodiment, the pre-pruning can cut off a lane with the obvious security risk. An example of an obvious security risk is that if the lane changing of the main vehicle is to be performed, there is an obstacle vehicle in the target lane behind the main vehicle, and the obstacle vehicle is faster than the main vehicle, and a distance between the obstacle vehicle and the main vehicle is within 10 meters. In this case, the lane changing cannot be performed. Therefore, it can be determined that the lane changing cannot be performed based on information such as the distance between the vehicles and the traffic flow and the like. Usually, the lane changing cannot be performed in a case that there are too many obstacle vehicles or the obstacle vehicle travels too fast. The lanes can be roughly screened through the pre-pruning. According to the number of obstacle vehicles on the target lane to be changed, and speed of the obstacle vehicle, a branch with high security risk is cut off firstly, that is, the lanes into which the lane changing cannot be performed are pre-screened from the candidate lanes.

The lanes determined by the navigation strategy can be ranked and pre-pruned with the machine learning model. After the pre-pruning, the subsequent two steps (S13 and S14) will be more effective. Since the lanes with poor conditions are first cut off by the changing pre-pruning, the amount of data for subsequent processing is reduced, so that the accuracy of subsequent processing is higher.

In an embodiment, a parameter of the machine learning model includes: at least one of a kinematic parameter of an obstacle, a kinematic parameter of the main vehicle, a distance between the obstacle and the main vehicle, and a state of the obstacle.

The kinematic parameter includes at least one of a speed and a position. The state of the obstacle includes at least one of a size of the obstacle, an orientation of the obstacle, and a category of the obstacle. The size of the obstacle may include the length, width, height, dimension, and shape of the obstacle. The size of the obstacle can indicate the degree of intrusion of the obstacle to the lane, including how much space the obstacle occupies in the lane. The category of the obstacle includes at least one of a long-term stationary category and a short-term stationary category. The category of the obstacle can indicate whether the obstacle is a dead vehicle, that is, whether the obstacle is a long-term stationary obstacle or a short-term stationary obstacle. In a case that it is a long-term stationary obstacle, its block degree to the lane will be more serious. The obstacle may be not an obstacle vehicle, but another obstacle such as a roadblock.

Figure 3:
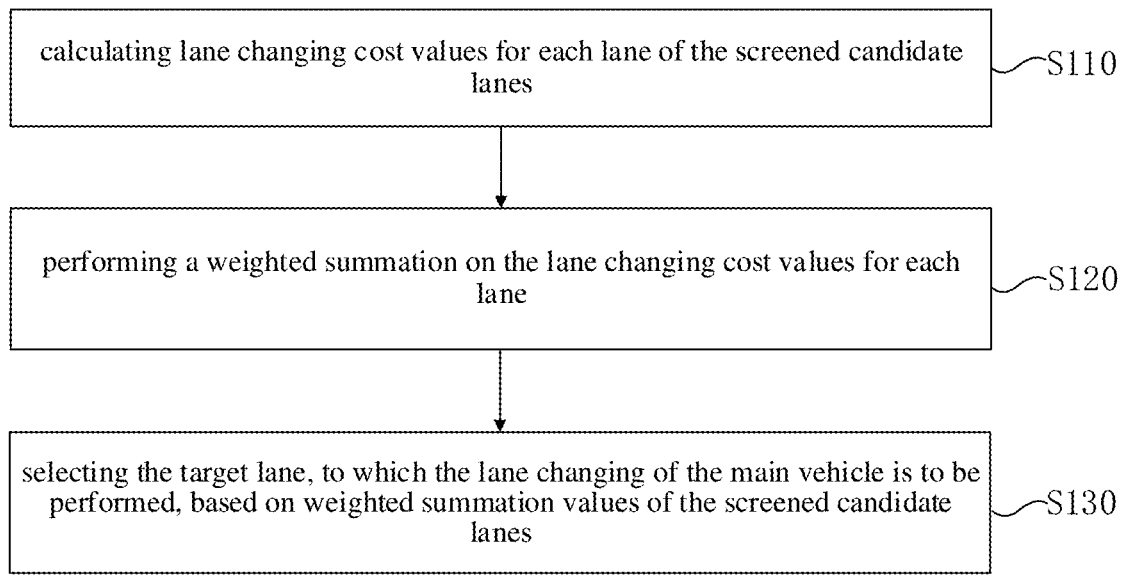
FIG. 3 is a flowchart of a lane selection of a lane changing method for a driverless vehicle according to an embodiment of the present application.

FIG. 3 is a flowchart of a lane selection of a lane changing method for a driverless vehicle according to an embodiment of the present application. As shown in FIG. 3, in S13 of FIG. 1, the selecting, from the screened candidate lanes, a target lane, to which the lane changing of the main vehicle is to be performed includes:

S110, calculating lane changing cost values for each lane of the screened candidate lanes;

S120, performing a weighted summation on the lane changing cost values for each lane; and S130, selecting the target lane, to which the lane changing of the main vehicle is to be performed, based on weighted summation values of the screened candidate lanes.

The lane changing of the driverless vehicle involves the following factors: (1) security factors; (2) the plan path of the lane changing of the main vehicle. For example, in a case that the driverless vehicle wants to turn right at the intersection, the driverless vehicle must change to the right turn lane to turn right, but it may be not safe to change to the right turn lane at the time. The lane changing to the right is the plan path of the driverless vehicle. Not only the plan path but also the security must be considered for the lane changing. Embodiments of the present application can assist a driverless vehicle to make a decision and select a lane suitable for travelling. For example, the relatively smooth lane is selected, so that the vehicle can reach a destination.

Specifically, at least two lane changing cost values may be preset. The lane changing cost value of a lane can be used to indicate the amount of cost of the lane changing to the lane. For example, the factors, such as the difficulty of the lane changing or the degree of passage and blockage of the lane, will affect the cost of the lane changing to the lane. Each of the lane changing cost values can indicate the effect of one of the factors on the lane changing cost. At least two lane changing cost values may be calculated for each of the selected candidate lanes, and then a weighted summation is performed on all lane changing cost values of each lane. The result of the weighted summation of a lane represents the cost of the lane changing to the lane in the context of various factors.

In an embodiment, the lane changing cost values includes at least two of a blocking cost value, a reference line cost value, and a lane keeping cost value. Multiple cost values corresponding to the various factors that need to be weighed are selected to complete the calculation, when performing the lane changing, in order to ensure the security of the lane changing. In one example, the above three cost values can be used simultaneously and be weighted.

Specifically, the meaning and calculation methods of the above lane changing cost values are as follows:

(1) The blocking cost value indicates the trafficability of the lane, that is, the passage and blockage degree of the lane. The larger the blocking cost value, the worse the trafficability of the lane. And the lane is blocked more seriously.

In an embodiment, the calculating lane changing cost values for each lane of the screened candidate lanes includes:

determining the blocking cost value according to at least one of a kinematic parameter of an obstacle, a kinematic parameter of the main vehicle, a distance between the obstacle and the main vehicle, and a state of the obstacle, wherein the kinematic parameter includes at least one of a speed and a position. The state of the obstacle includes at least one of a size of the obstacle, an orientation of the obstacle, and a category of the obstacle. The size of the obstacle may include the length, width, height, dimension, and shape of the obstacle. The size of the obstacle can indicate the degree of intrusion of the obstacle to the lane, including how much space the obstacle occupies in the lane. The category of the obstacle includes at least one of a long-term stationary category and a short-term stationary category. The category of obstacles can indicate whether the obstacle is a dead vehicle, whether it is a long-term stationary obstacle or a short-term stationary obstacle. In a case that it is a long-term stationary obstacle, its block degree to the lane will be more serious. The obstacle may be not an obstacle vehicle, but another obstacle such as a roadblock.

The above factors may affect the trafficability of the lane, and the blocking cost value may be determined according to at least one of these factors. For example, in the case where the speed of the obstacle on a certain lane is fast, it is determined that the blocking cost value of the lane is correspondingly large. For another example, in the case where the volume of the obstacle on a certain lane is large, it is determined that the blocking cost value of the lane is correspondingly large. For another example, in a case that the obstacle on a certain lane belongs to the long-term stationary category, it is determined that the blocking cost value of the lane is correspondingly large.

(2) The reference line cost value indicates the difficulty level of the lane changing. The larger the value, the harder the lane changing.

In an embodiment, the calculating lane changing cost values for each lane of the screened candidate lanes includes:

determining the reference line cost value according to a length of a lane changing section corresponding to a current position of the main vehicle.

Figure 4:
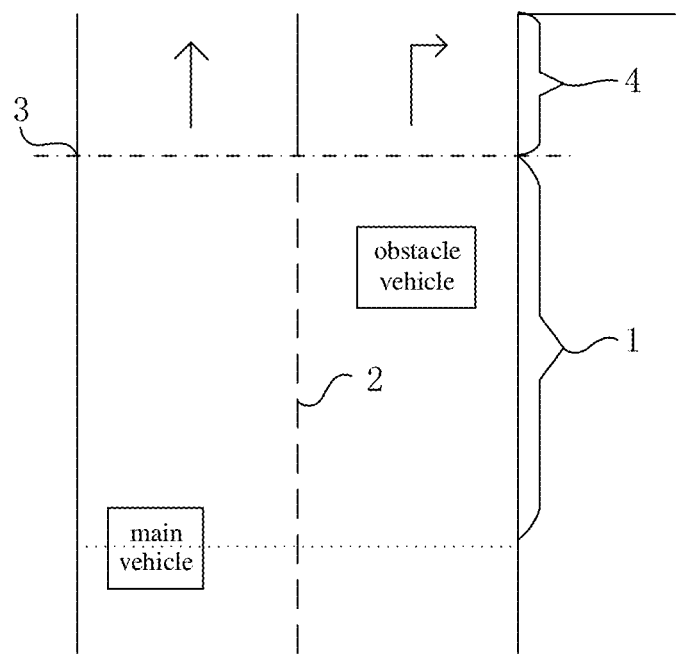
FIG. 4 is a schematic diagram of a lane changing scenario of a lane changing method for a driverless vehicle according to an embodiment of the present application.
Figure 5:
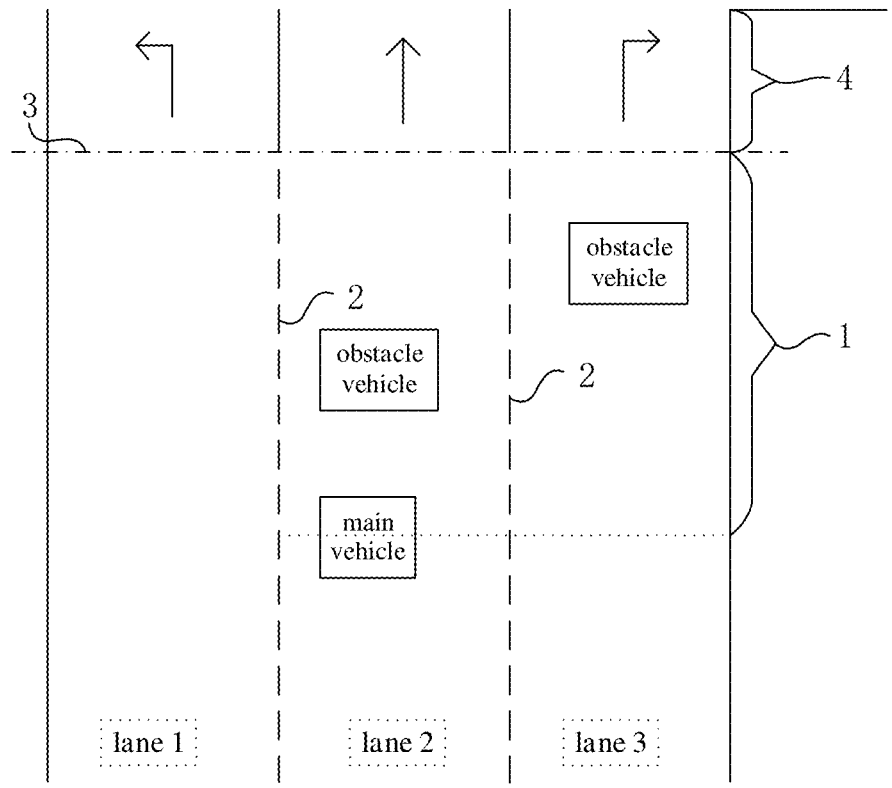
FIG. 5 is a schematic diagram of a lane changing scenario of a lane changing method for a driverless vehicle according to an embodiment of the present application.

FIG. 4 and FIG. 5 are schematic diagrams of a lane changing scenario of a driverless vehicle according to a lane changing method for a driverless vehicle according to an embodiment of the present application. There are two lanes in the scenario shown in FIG. 4, which are a straight lane and a right turn lane, respectively. There are three lanes in the scenario shown in FIG. 5, which are the straight lane, the left turn lane and the right turn lane, respectively. In FIG. 4 and FIG. 5, reference number 1 denotes a lane changing section, a dashed line indicated by reference number 2 indicates a reference line, a dash dot line indicated by reference number 3 indicates an end point of the lane changing section, and reference number 4 indicates an infeasible lane changing section. Here, the lane changing can be performed in the lane section corresponding to the dashed line (reference line) indicated by reference number 2. In other words, the position of the main vehicle at the time of performing the lane changing must be before the dash dot line (the end point of the lane changing section) indicated by the reference number 3, and the lane changing can be implemented when this condition is satisfied. Therefore, a lane changing can be performed in the area between the current position of the main vehicle and the dash dot line indicated by reference number 3, and this area is the lane changing section 1. Above the dash dot line indicated by the reference number 3, the dashed line indicated by the reference 2 is extended upward to become a solid line, and the lane changing is not performed in the lane section corresponding to the solid line. This area is the infeasible lane changing section 4.

Referring to FIG. 4, in one example, when the main vehicle wants to turn right, the position of the main vehicle at this time is in the road area drawn with a dashed line, that is, the lane changing section 1 corresponds to the reference line indicated by the reference number 2. The position of the main vehicle is 500 meters from the infeasible lane changing section 4, that is, the distance from the current position of the main vehicle to the end point 3 of the lane changing section is 500 meters. In this case, the lane can be changed over a length of 500 meters. For an action of changing the lane, the distance of 500 meters is long enough to easily change the lane. Therefore, the reference line cost value of the target lane to which the lane changing is to be performed is relatively small. However, in another case, in a case that the distance between the current position of the main vehicle and the end point 3 of the lane changing section is only 50 meters, the lane changing cannot performed easily. In this case, the reference line cost value of the target lane to which the lane changing is to be performed is relatively large. In this example, the reference line cost value may be determined according to the length of the lane changing section associated with the current position of the main vehicle.

The solid and dashed lines in FIG. 4 and FIG. 5 are both marked on the map and correspond to the road lines drawn in the actual road. The road lines drawn in the road include the solid lines and dashed lines. According to the regulations, the lane can be changed at the dashed line position without affecting the normal driving of other vehicles, but the lane cannot be changed at the solid line. The solid line can be seen as an invisible fence in traffic, and should not be crossed during travelling of the vehicle.

(3) Lane keeping cost value (lane keeping cost value) indicates accessibility.

In one embodiment, the calculating lane changing cost values for each lane of the screened candidate lanes includes:

determining the lane keeping cost value based on the number of lane changing from the current lane to the candidate lane and/or the travelling intention of the main vehicle.

Referring to FIG. 5, in one example, the driverless vehicle is in a scenario where the vehicle wants to turn right, and the target lane at this time is the right turn lane (the lane 3 in FIG. 5). The difficulty of the lane changing from the lane 2 to the lane 3 is different from the difficulty of the lane changing from the lane 1 to the lane 3. It is only necessary to perform one lane changing from the lane 2 to the lane 3, and two lane changings from the lane 1 to the lane 3. The farther the distance between the current lane and the target lane is, the more difficult it is to perform the lane changing, and the worse the accessibility of the target lane is. The lane keeping cost value is a cost value that evaluates the distance between the current lane and the target lane. Therefore, the lane keeping cost value of a lane can indicate the difficulty of changing to the lane. The greater the lane keeping cost value of a lane, the more difficult it is to perform the lane changing to that lane.

Referring to FIG. 5, in another example, the main vehicle located on the lane 2 wants to turn right. In a case that there is no obstacle on the lane 1 and the lane 3, and there is an obstacle on the lane 2, then a selection is made between the lane 1 and the lane 3. And preferably, the lane is changed to the lane 3, since the intention of main vehicle is to turn right. In other words, the lanes that conform to the plan path of the main vehicle have relatively good accessibility. Therefore, the lane keeping cost value of the lane can be determined to be a relatively smaller value, in a case that the lane conforms to the plan path of the main vehicle.

Scenarios in which a driverless vehicle performs a lane changing include a lane changing when cornering, and sometimes a lane changing when going straight. Referring to FIG. 5, in another example, the current lane of the main vehicle is a straight lane (the lane 2), and the two sides are a left turn lane (the lane 1) and a right turn lane (the lane 3). At this time, the accident vehicle in the front of the main vehicle in the lane 2 blocks the straight lane, so that the trafficability of the lane 2 is not good and the blocking cost value is large, that is, the lane 2 is not the most suitable lane for driving. Therefore, the main vehicle can choose to change the lane to the right. After changing lanes to the right turn lane, in a case that the main vehicle have bypassed the accident vehicle on the lane 2, the main vehicle will have to change back to the straight lane. Since the main vehicle bypasses the accident vehicle, the trafficability of the lane 2 becomes better, and the lane 2 is the lane that conforms to the plan path of the main vehicle, and the lane 3 does not conform to the plan path of the main vehicle. In contrast, the lane 2 is the most suitable lane for travelling, and the main vehicle has to perform the lane changing back to lane 2.

Figure 6:
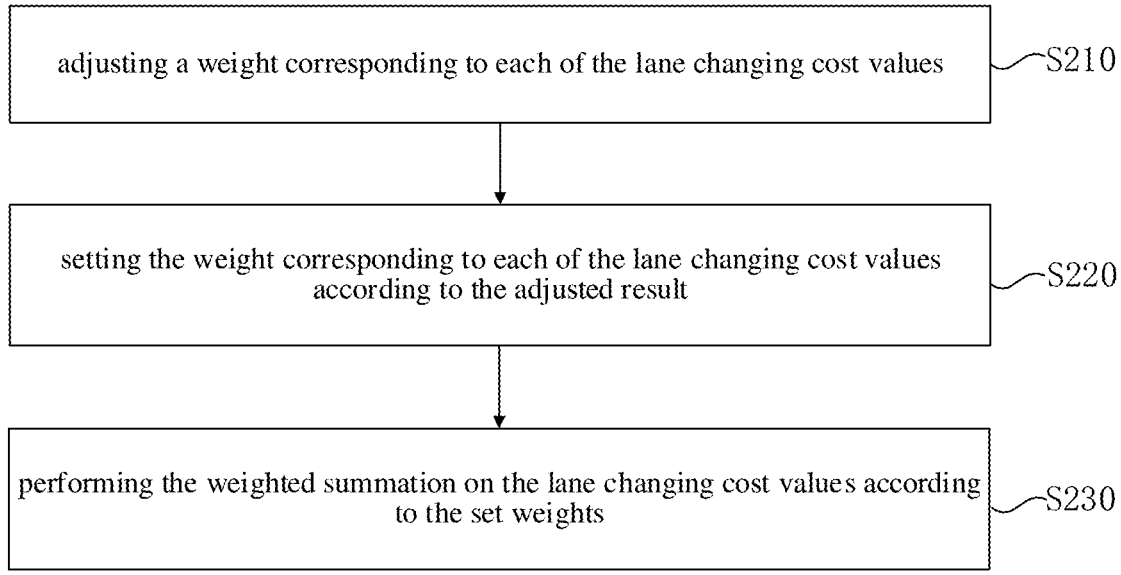
FIG. 6 is a flowchart of a weighted summation of lane changing cost values of a lane changing method for a driverless vehicle according to an embodiment of the present application.

FIG. 6 is a flowchart of a weighted summation of lane changing cost values of a lane changing method for a driverless vehicle according to an embodiment of the present application. As shown in FIG. 6, in an embodiment, in S120 of FIG. 3, the performing a weighted summation on the lane changing cost values for each lane includes:

S210, adjusting a weight corresponding to each of the lane changing cost values;

S220, setting the weight corresponding to each of the lane changing cost values according to the adjusted result; and S230, performing the weighted summation on the lane changing cost values according to the set weights.

In one example, the above three lane changing cost values are calculated separately for each lane. Then, the weighted summation is performed on the three lane changing cost values, and according to a result of the weighted summation of each lane, it is determined which lane is the most suitable lane for travelling at the current time, and a result of the weighted summation of each lane can be regarded as the total lane changing cost value of the lane. The set weight is determined according to the adjusted result. Finally, the lane with the least result of the weighted summation of the three cost values is selected, that is, the lane with the smallest lane changing cost. In a case that the current lane is not the best lane to travel, the most suitable lane may be selected to be changed.

In the above example, the weighted summation is performed on the lane changing cost values of a certain lane by the following formula:

$$s = w_1 * COST_1 + w_2 * COST_2 + w_3 * COST_3$$

where s represents the result of the weighted summation of the lane changing cost values of a certain lane; $COST_1$ represents the blocking cost value; $w_1$ represents the weight corresponding to the blocking cost value; $COST_2$ represents the reference line cost value; $w_2$ represents the weight corresponding to the reference line cost value; $COST_3$ represents the lane keeping cost value; $w_3$ represents the weight corresponding to the lane keeping cost value.

Referring to FIG. 5, in one example, the current main vehicle is located at the lane 1, and there is a stationary obstacle at the lane 2 at the current time. Then, the blocking cost value of the lane 2 may be large, that is, the trafficability is not good. Since the blocking cost value of the lane 2 is large, the result of the weighted summation of the lane changing cost values for the lane is also large, that is, the cost of lane changing to the lane 2 is large. In a case that there is also a blocked obstacle on the lane 1, only the lane 3 can be selected. Since the trafficability of the lane 1 and the lane 2 are not good, the cost of lane changing to the lane 2 and the lane 3 is large. In a case that the lane 3 has no obstacle, then the result of the weighted summation of the lane changing cost values for the lane 3 is the smallest, the cost of lane changing to the lane 3 is the smallest, and the lane 3 is most suitable for travelling. The lane 3 is selected to be changed.

As described in the foregoing examples, the main vehicle is located in the lane 2, the current lane is blocked, the trafficability is not good, and the blocking cost value of the lane 2 is large, so that the result of the weighted summation of the lane changing cost values for the lane 2 is also larger. Since the current lane is not the best lane for travelling, the lane 2 can be selected to be changed to the lane 3. After changing the lane to the lane 3 and bypassing the blockage, the lane changing is again performed by using the method of the embodiment of the present application. At this time, both the lane 2 and the lane 3 are not blocked, and the blocking cost values of these two lanes are small. The lane 2 is a lane that conforms to the plan path of the main vehicle, and the lane 3 does not conform to the plan path of the main vehicle. So compared with the lane keeping cost value of the lane 3, the lane keeping cost value of the lane 2 is relatively small. In the context of various factors, the results of the weighted summation of the lane changing cost values for the lane 2 and the lane 3 are calculated respectively. In contrast, the result of the weighted summation of the lane changing cost values for the lane 2 is the smaller, a lane changing back to the lane 2 is performed. Since the main vehicle's plan is to go straight, the lane 2 is the best lane to travel.

Therefore, by using the lane changing method of the embodiment of the present application, it is possible to ensure that the lane most suitable for travelling can be selected in real time at any time to avoid the collision. The driverless vehicle determines in real time at any position whether it is necessary to perform the lane changing, and which lane is more suitable to be changed to. The result of the weighted summation of the lane changing cost values for a lane represents the amount of cost that is required to perform the lane changing to that lane. In a case that the weighted summation result of the lane changing cost values for the current lane is not the smallest, and the result of the weighted summation of the lane changing cost values for the other lane is the smallest, a lane changing to the lane with the least cost can be performed.

The above technical solution has the following advantages or beneficial effects: the most suitable travelling lane is selected according to the result of the weighted summation of the lane changing cost values, to assist the driverless vehicle to make a decision according to the real-time road condition and the plan path of the driverless vehicle, thereby making the driverless driving more safe and smooth.

Figure 7:
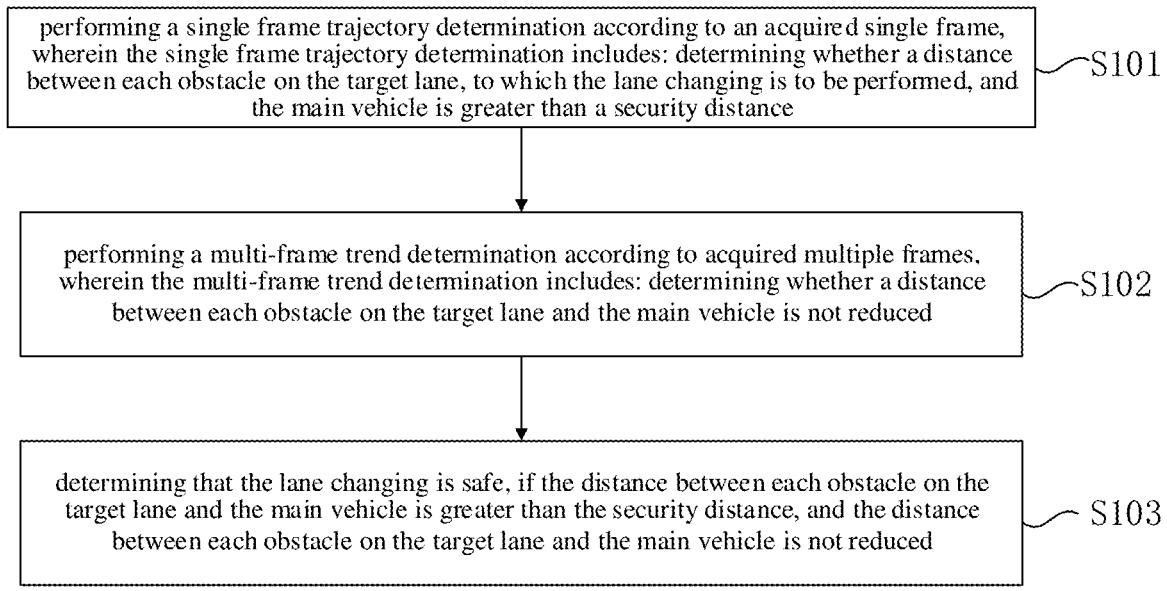
FIG. 7 is a flowchart of a security determination of a lane changing method for a driverless vehicle according to an embodiment of the present application.

FIG. 7 is a flowchart of a security determination of a lane changing method for a driverless vehicle according to an embodiment of the present application. As shown in FIG. 7, in the S14 of FIG. 1, the determining whether the lane changing of the main vehicle from the current lane to the target lane is safe includes:

S101, performing a single frame trajectory determination according to an acquired single frame, wherein the single frame trajectory determination includes: determining whether a distance between each obstacle on the target lane, to which the lane changing is to be performed, and the main vehicle is greater than a security distance;

S102, performing a multi-frame trend determination according to acquired multiple frames, wherein the multi-frame trend determination includes: determining whether a distance between each obstacle on the target lane and the main vehicle is not reduced; and S103, determining that the lane changing is safe, if the distance between each obstacle on the target lane and the main vehicle is greater than the security distance, and the distance between each obstacle on the target lane and the main vehicle is not reduced.

Data acquisition devices such as cameras, radars, and sensors in driverless vehicle systems typically acquire data at specific data acquisition frequencies. In one example, the camera acquisition frequency designed by the driverless vehicle system is 30 Hz, which means that 30 frames of data are acquired per second. The above "single frame trajectory determination" includes determining a trajectory by using the acquired single frame. The "multi-frame trend determination" includes determining a change trend of the distance between the obstacle and the main vehicle by using the acquired continuous multiple frames. Specifically, a minimum distance of each obstacle relative to the main vehicle is determined by using each frame of the continuous multiple frames, and then the change trend of the minimum distance corresponding to the acquired continuous multiple frames may be analyzed to determine whether the minimum distance is reduced. In a case that the minimum distance is reduced, the lane changing is not safe.

In one embodiment, only the determination condition of "single frame trajectory determination" is used, that is, determining whether the distance of each obstacle relative to the main vehicle is greater than the security distance. In one example, it may be determined whether the lateral distance of each obstacle relative to the main vehicle is greater than the lateral security distance, and whether the longitudinal distance is greater than the longitudinal security distance. In a case that the result of the above determination is that both are greater, then it is determined that the lane changing is safe at this time.

In another embodiment, the determination conditions of "single frame trajectory determination" and "multi-frame trend determination" can be used at the same time, that is, the condition that the distance of each obstacle relative to the main vehicle is greater than the security distance, and the condition that the change trend of the minimum distance is not reduced. When the above two conditions are simultaneously satisfied, it is determined that the lane changing is safe at this time.

FIG. 8 is a flowchart of single frame trajectory determination of a lane changing method for a driverless vehicle according to an embodiment of the present application. As shown in FIG. 8, in an embodiment, in the S101 in FIG. 7, the determining whether a distance between each obstacle on the target lane and the main vehicle is greater than a security distance includes:

S201, calculating the security distance between each obstacle on the target lane and the main vehicle, the security distance including a lateral security distance and a longitudinal security distance;

S202, determining that the distance between the obstacle and the main vehicle is greater than the security distance, in a case that the lateral distance between the obstacle and the main vehicle is greater than the lateral security distance, and the longitudinal distance between the obstacle and the main vehicle is greater than the longitudinal security distance.

The data to be acquired for "single frame trajectory determination" includes: the position and the speed of the main vehicle, the head angle of the main vehicle; the position, the speed, the acceleration of the obstacle and the head angle of the obstacle vehicle; the map information, the lane information, and the like. For example, the lane information may include which lanes the main vehicle and the obstacle are on. The map information may include a lane relation, and the plan path may be planned according to the lane relation. In one example, although a certain obstacle vehicle in an opposite lane is behind the main vehicle, the opposite lane cannot be the target lane for performing the lane changing. In this case, according to the position of the obstacle vehicle, the obstacle vehicle is not considered when performing the lane changing security determination method for the driverless vehicle.

FIG. 9 is a schematic diagram of a security distance of a lane changing method for a driverless vehicle according to an embodiment of the present application. Reference sign H2 in FIG. 9 represents the lateral distance between the main vehicle and the obstacle vehicle. Reference sign H1 in FIG. 9 represents the longitudinal distance between the main vehicle and the obstacle vehicle.

The security distance includes a lateral security distance and a longitudinal security distance. The lateral security distance is a component of the distance between the two vehicles in a direction perpendicular to the lane, and the longitudinal security distance is a component of the distance between the two vehicles in a direction parallel to the lane. The lateral security distance refers to the minimum distance that can ensure the security of the two vehicles without accidents during the side-by-side travelling process or when travelling in parallel while overtaking. The longitudinal security distance refers to a distance that ensures the rear vehicle cannot hit the front vehicle, in the case where the rear vehicle is also subsequently braked after the front vehicle is braked suddenly. This distance is the security distance between the front and rear vehicles.

In this embodiment, the security distance is calculated based on the result of the main vehicle plan and the predicted trajectory of the obstacle. Then, it is determined whether the main vehicle is safe based on the security distance. The distance between the main vehicle and the obstacle cannot be less than the security distance at the current time. In a case that the distance between the main vehicle and the obstacle is less than the security distance at the current time, it can be determined that the lane changing is unsafe. In a case that the lateral distance between the main vehicle and the obstacle is greater than the lateral security distance and the longitudinal distance is greater than the longitudinal security distance at the current time, it is determined that the lane changing can be performed relatively safely at the current time. On this basis, then, the determination condition of "multi-frame trend determination" can be used to determine the security for performing the lane changing at the current time.

In one example, the main vehicle may plan the trajectory in a set period of time. For example, the trajectory of the main vehicle in the next 8 seconds is planned, and the trajectory of the obstacle vehicle in the next 8 seconds is predicted. According to the determination condition of "single frame trajectory determination", it is estimated, from the current time to, whether the distance between the two vehicles within 8 seconds is greater than the security distance or not.

FIG. 10 is a flowchart of multi-frame trend determination of a lane changing method for a driverless vehicle according to an embodiment of the present application. As shown in FIG. 10, in an embodiment, in the "multi-frame trend determination" in S102 of FIG. 7 the determining whether a distance between each obstacle on the target lane and the main vehicle is not reduced includes:

S310, calculating the distance between each obstacle on the target lane and the main vehicle in each frame of acquired continuous multiple frames, the distance including a lateral distance and a longitudinal distance;

S320, determining whether the distance is not reduced.

In this embodiment, the distance of each obstacle on the target lane relative to the main vehicle can be calculated from each frame of data. The change trend of the distance of each obstacle relative to the main vehicle can be analyzed based on the data of continuous multiple frames. In a case that it is determined that, according to the data of multiple continuous frames of an obstacle behind the main vehicle, the distance between the two vehicles is reduced, it is determined that the lane changing is unsafe. In the case where the distance of the obstacle relative to the main vehicle is increased or keeps constant, the lane changing may be safely performed.

For example, the main vehicle wants to perform the lane changing at the current moment. At this time, there is an accelerating obstacle vehicle behind the main vehicle. The acceleration of the obstacle vehicle indicates that the obstacle vehicle has no intention to avoid collision. In the case of rear vehicle acceleration, the distance between the front and rear vehicles will be decreased, and the security distance that needs to be maintained between the front and rear vehicles will be increased. In this case, by using the "multi-frame trend determination", it is determined that the distance of the obstacle vehicle relative to the main vehicle is decreased. Therefore it is unsafe to perform the lane changing of the main vehicle at the current time.

In one example, the travelling trajectory of the main vehicle within the set period of time is planned. For example, the travelling trajectory of the main vehicle in the next 8 seconds is planned, and the trajectory of the obstacle vehicle in the next 8 seconds is predicted. According to the "multi-frame trend determination", after acquiring the first frame, starting from the current time $t_1$ according to the first frame, the first minimum distance between the two vehicles within 8 seconds is derived; after the acquiring second frame, starting from the current time $t_2$ according to the second frame, the second minimum distance between the two vehicles within 8 seconds is derived; then the change trend of the minimum distance is determined. In this example, the change trend of the minimum distance can be determined according to the two frames acquired continuously. In another example, determining the change trend may be based on continuously acquired multiple frames, for example, determining a change trend of the minimum distance based on three or more frames continuously acquired.

In one embodiment, the method includes: re-determining whether the lane changing of the main vehicle from the current lane to the target lane is safe in response to an acquisition of a next frame, in a case that the lane changing is not safe at a current time.

In the case where it is determined that the lane changing of the main vehicle is not safe at the current time, the lane changing of the main vehicle cannot be performed. After the next frame is acquired, it is re-determined whether the lane changing of the main vehicle from the current lane to the target lane is safe according to the newly acquired data. After each frame of data is acquired, the newly acquired data is used to re-determine in real time whether the execution of the lane changing is safe, in order to find a safe time to perform the lane changing.

The above technical solution has the following advantages or beneficial effects: the safety determination of the lane changing of the driverless vehicle can be more accurate by determining the change trend of the distance between the obstacle and the main vehicle according to continuous multiple frames, thereby reducing the accident probability and improving the safe travel performances of driverless vehicle.

Figure 11:
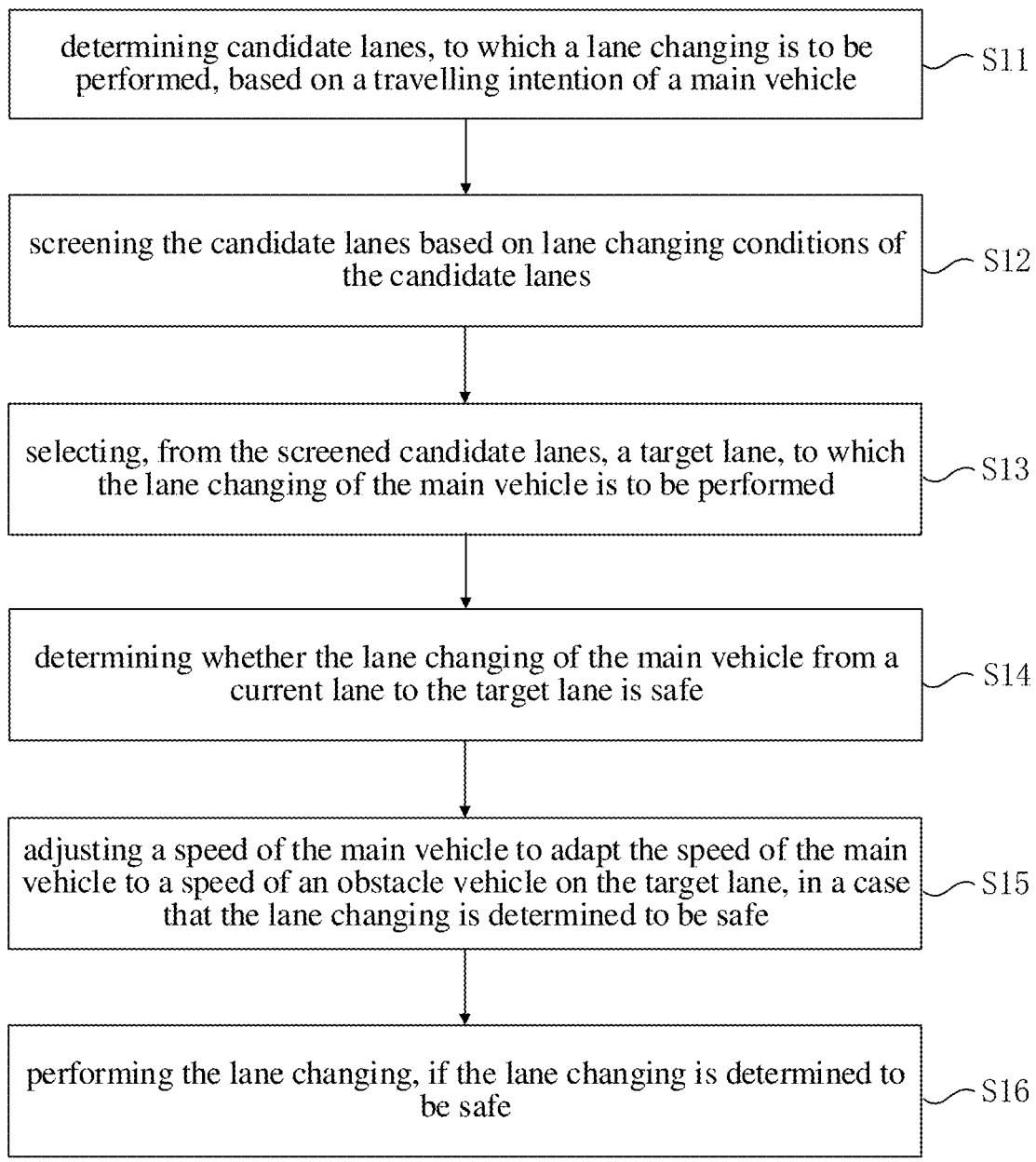
FIG. 11 is a flowchart of a lane changing method for a driverless vehicle according to an embodiment of the present application.

FIG. 11 is a flowchart of a lane changing method for a driverless vehicle according to an embodiment of the present application. As shown in FIG. 11, in an embodiment, before S16, that is, before performing the lane changing, if the lane changing is determined to be safe, the method further includes:

S15, adjusting a speed of the main vehicle to adapt the speed of the main vehicle to a speed of an obstacle vehicle on the target lane, in a case that the lane changing is determined to be safe.

Figure 12:
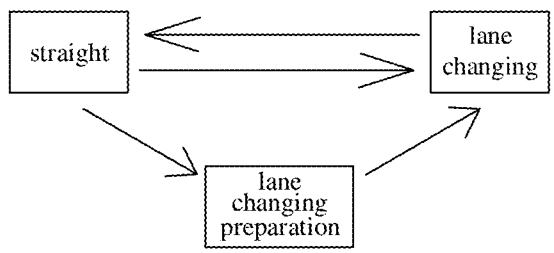
FIG. 12 is a schematic diagram of a state transition during a lane changing process of a lane changing method for a driverless vehicle according to an embodiment of the present application.

FIG. 12 is a schematic diagram of a state transition during a lane changing process of a lane changing method for a driverless vehicle according to an embodiment of the present application. As shown in FIG. 12, the states during the lane changing may include a straight state, a lane changing state, and a lane changing preparation state. The main vehicle is normally in a straight state, and can be directly switched to the lane changing state from the straight state, and can also be switched back to the straight state from the lane changing state. In another case, there may be a lane changing preparation state between the straight state and the lane changing state, and the main vehicle may be first switched from the straight state to the lane changing preparation state, and then be switched from the lane changing preparation state to the lane changing state, and finally be switched from the lane changing state to the straight state.

For example, the lane changing preparation state may include the case where the remaining length of the lane changing section associated with the current position where the main vehicle is located is very small, such as less than 200 meters or less than 100 meters. When the remaining length of the lane changing section is less than a predetermined distance threshold, an active adjustment of the speed may be triggered to find an opportunity to perform the lane changing. Finding opportunities to perform the lane changing is different from the above waiting for opportunities to perform the lane changing. The lane changing preparation may include adjusting the speed of the main vehicle to be adapted to the speed of the obstacle vehicle on the target lane. The speed of the main vehicle is adjusted according to the traffic flow and the speed of the obstacle vehicle on the target lane. The main vehicle is waiting for a suitable lane changing opportunity, while the speed of the main vehicle is being adjusted, and then the lane changing can be performed in the case where the timing is appropriate.

As described above, there may be a lane changing preparation state from the straight state to the lane changing state, but there is not necessarily the lane changing preparation state. For example, in a case that the remaining length of the lane changing section does not reach the predetermined distance threshold, that is, without triggering the active adjustment of the speed of the main vehicle, there may be an opportunity to perform the lane changing. In this case, the main vehicle can be switched from the straight state to the lane changing state. In a case that the lane changing is completed when there is the opportunity to perform the lane changing, it is unnecessary to enter the lane changing preparation state. However, in a case that the remaining length of the lane changing section for the main vehicle is less than the predetermined distance threshold, it is necessary to trigger the active adjustment of the vehicle speed to find an opportunity to perform the lane changing. In this case, it is necessary to enter the lane changing preparation state. In one example, there are few obstacle vehicles on the current road segment, and there may be many opportunities to perform the lane changing when the remaining length of the lane changing section does not reach the predetermined distance threshold, so it may not be necessary to enter the lane changing preparation state. In another example, in a case that there are many obstacle vehicles on the target lane, it is usually necessary to enter the lane changing preparation state. After entering the lane changing preparation state, the speed of the obstacle vehicle may be determined and the speed of the main vehicle may be adjusted to find the opportunity to perform the lane changing.

The above technical solution has the following advantages or beneficial effects: a safe and reasonable lane changing decision can be made through comprehensive determination based on information such as lane changing conditions to select the lane that is most suitable for travelling, and to perform the lane changing at a safe time, thereby greatly reducing probability of accidents and ensuring that the lane changing of the driverless vehicle is safely and smoothly performed.

Figure 13:
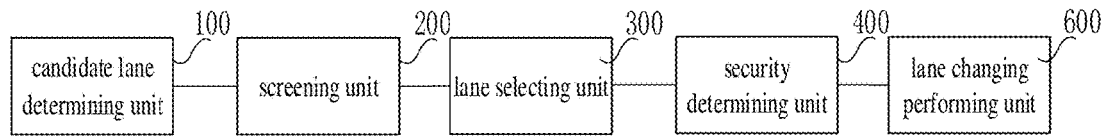
FIG. 13 is a structural block diagram of a lane changing device for a driverless vehicle according to an embodiment of the present application.

FIG. 13 is a structural block diagram of a lane changing device for a driverless vehicle according to an embodiment of the present application. As shown in FIG. 13, a lane changing device for a driverless vehicle is provided according to an embodiment of the application. The device includes:

a candidate lane determining unit 100, configured to determine candidate lanes, to which a lane changing is to be performed, based on a travelling intention of a main vehicle;

a screening unit 200, configured to screen the candidate lanes based on lane changing conditions of the candidate lanes;

a lane selecting unit 300, configured to select, from the screened candidate lanes, a target lane, to which the lane changing of the main vehicle is to be performed;

a security determining unit 400, configured to determine whether the lane changing of the main vehicle from a current lane to the target lane is safe; and a lane changing performing unit 600, configured to perform the lane changing, if the lane changing is determined to be safe.

In one embodiment, the screening unit 200 is further configured to:

rank the candidate lanes with a machine learning model, wherein the candidate lanes with high security risk and/or poor trafficability are ranked behind; and screen out at least one of the candidate lanes ranked behind.

In one embodiment, a parameter of the machine learning model includes: at least one of a kinematic parameter of an obstacle, a kinematic parameter of the main vehicle, a distance between the obstacle and the main vehicle, and a state of the obstacle, and wherein the kinematic parameter includes at least one of a speed and a position; the state of the obstacle includes at least one of a size of the obstacle, an orientation of the obstacle, and a category of the obstacle; and the category of the obstacle includes at least one of a long-term stationary category and a short-term stationary category.

Figure 14:
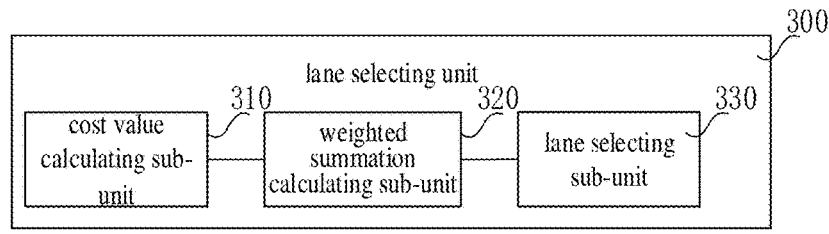
FIG. 14 is a structural block diagram of a lane selection unit of a lane changing device for a driverless vehicle according to an embodiment of the present application.

FIG. 14 is a structural block diagram of a lane selection unit of a lane changing device for a driverless vehicle according to an embodiment of the present application. As shown in FIG. 14, in one embodiment, the lane selecting unit 300 includes:

a cost value calculating sub-unit 310, configured to calculate lane changing cost values for each lane of the screened candidate lanes;

a weighted summation calculating sub-unit 320, configured to perform a weighted summation on the lane changing cost values for each lane; and a lane selecting sub-unit 330, configured to select the target lane, to which the lane changing of the main vehicle is to be performed, based on weighted summation values of the screened candidate lanes.

In one embodiment, the lane changing cost values include at least two of a blocking cost value, a reference line cost value, and a lane keeping cost value.

In one embodiment, the cost value calculating sub-unit 310 is further configured to:

determine the blocking cost value according to at least one of a kinematic parameter of an obstacle, a kinematic parameter of the main vehicle, a distance between the obstacle and the main vehicle, and a state of the obstacle, wherein the kinematic parameter includes at least one of a speed and a position; the state of the obstacle includes at least one of a size of the obstacle, an orientation of the obstacle, and a category of the obstacle; and the category of the obstacle includes at least one of a long-term stationary category and a short-term stationary category.

In one embodiment, the cost value calculating sub-unit 310 is further configured to:

determine the reference line cost value according to a length of the lane changing section corresponding to a current position of the main vehicle.

In one embodiment, the cost value calculating sub-unit 310 is further configured to:

determine the lane keeping cost value based on the number of lane changing from the current lane to the candidate lane and/or the travelling intention of the main vehicle.

In one embodiment, the weighted summation calculating sub-unit 320 is further configured to:

adjust a weight corresponding to each of the lane changing cost values;

set the weight corresponding to each of the lane changing cost values according to the adjusted result; and perform the weighted summation on the lane changing cost values according to the set weights.

Figure 15:
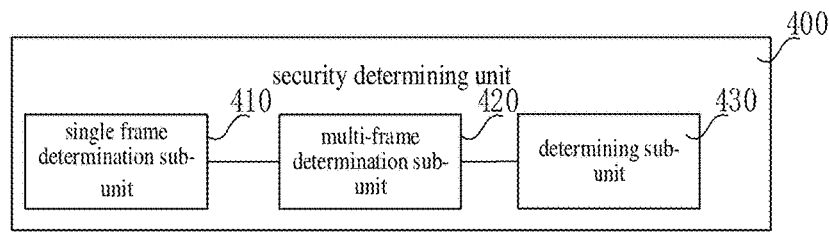
FIG. 15 is a structural block diagram of a security determining unit of a lane changing device for a driverless vehicle according to an embodiment of the present application.

FIG. 15 is a structural block diagram of a security determining unit of a lane changing device for a driverless vehicle according to an embodiment of the present application. As shown in FIG. 15, in one embodiment, the security determining unit 400 includes:

a single frame determination sub-unit 410, configured to perform a single frame trajectory determination according to an acquired single frame, wherein the single frame trajectory determination includes: determining whether a distance between each obstacle on the target lane, to which the lane changing is to be performed, and the main vehicle is greater than a security distance;

a multi-frame determination sub-unit 420, configured to perform a multi-frame trend determination according to acquired multiple frames, wherein the multi-frame trend determination includes: determining whether a distance between each obstacle on the target lane and the main vehicle is not reduced; and a determining sub-unit 430, configured to determine that the lane changing is safe, if the distance between each obstacle on the target lane and the main vehicle is greater than the security distance, and the distance between each obstacle on the target lane and the main vehicle is not reduced.

In one embodiment, the multi-frame determination sub-unit 420 is further configured to:

calculate the distance between each obstacle on the target lane and the main vehicle in each frame of acquired continuous multiple frames, the distance including a lateral distance and a longitudinal distance; and determine whether the distance is not reduced.

In one embodiment, the single frame determination sub-unit 410 is further configured to:

calculate the security distance between each obstacle on the target lane and the main vehicle, the security distance including a lateral security distance and a longitudinal security distance; and determine that the distance between the obstacle and the main vehicle is greater than the security distance, in a case that the lateral distance between the obstacle and the main vehicle is greater than the lateral security distance, and the longitudinal distance between the obstacle and the main vehicle is greater than the longitudinal security distance.

In one embodiment, the security determining unit 400 is further configured to:

re-determine whether the lane changing of the main vehicle from the current lane to the target lane is safe after an acquisition of a next frame, if it is determined that the lane changing is not safe at a current time.

Figure 16:
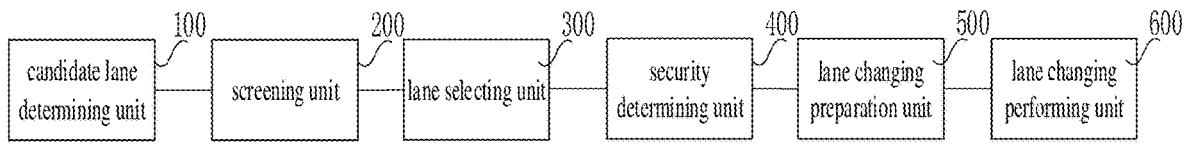
FIG. 16 is a structural block diagram of a lane changing device for a driverless vehicle according to an embodiment of the present application.

FIG. 16 is a structural block diagram of a lane changing device for a driverless vehicle according to an embodiment of the present application. As shown in FIG. 16, in one embodiment, the device further includes a lane changing preparation unit 500, configured to:

adjust a speed of the main vehicle to adapt the speed of the main vehicle to a speed of an obstacle vehicle on the target lane, in a case that the lane changing is determined to be safe.

In this embodiment, functions of modules in the device refer to the corresponding description of the above mentioned method and thus the description thereof is omitted herein.

In a possible design, the lane changing device includes a processor and a storage, the storage is configured to store a program for supporting the above lane changing method executed by the lane changing device, the processor is configured to execute the program stored in the storage.

The lane changing device further includes a communication interface configured for communication between the lane changing device and another apparatus or communication network.

Figure 17:
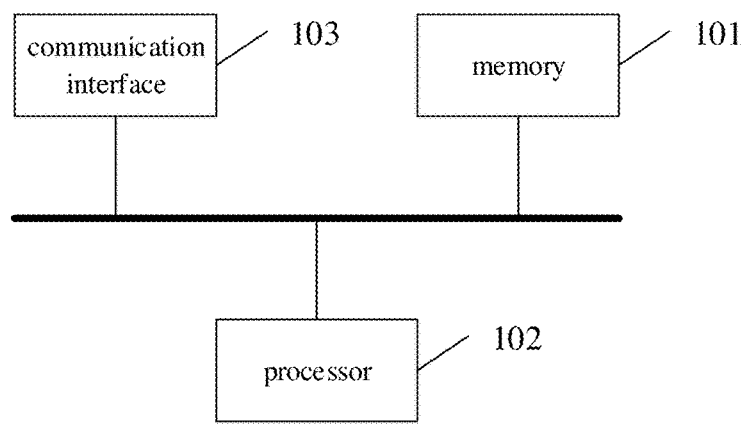
FIG. 17 is a structural block diagram of a lane changing device for a driverless vehicle according to an embodiment of the present application.

FIG. 17 is a structural block diagram of a lane changing device for a driverless vehicle according to an embodiment of the present application. As shown in FIG. 17, the device includes a memory 101 and a processor 102. The memory 101 stores a computer program executable on the processor 102. When the processor 102 executes the computer program, the lane changing method in the foregoing embodiment is implemented. The number of the memory 101 and the processor 102 may be one or more.

The device further includes:

a communication interface 103 configured to communicate with an external device and exchange data.

The memory 101 may include a high-speed RAM memory and may also include a non-volatile memory, such as at least one magnetic disk memory.

If the memory 101, the processor 102, and the communication interface 103 are implemented independently, the memory 101, the processor 102, and the communication interface 103 may be connected to each other through a bus and communicate with one another. The bus may be an Industry Standard Architecture (ISA) bus, a Peripheral Component Interconnect (PCI) bus, an Extended Industry Standard Component (EISA) bus, or the like. The bus may be divided into an address bus, a data bus, a control bus, and the like. For ease of illustration, only one bold line is shown in FIG. 17, but it does not mean that there is only one bus or one type of bus.

Optionally, in a specific implementation, if the memory 101, the processor 102, and the communication interface 103 are integrated on one chip, the memory 101, the processor 102, and the communication interface 103 may implement mutual communication through an internal interface.

A computer-readable storage medium is provided according to an embodiment of the present application, which stores a computer program. The computer program, when executed by a processor, implements any one of the above lane changing methods.

In the description of the specification, the description of the terms "one embodiment," "some embodiments," "an example," "a specific example," or "some examples" and the like means the specific features, structures, materials, or characteristics described in connection with the embodiment or example are included in at least one embodiment or example of the present application. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the present application, "a plurality of" means two or more, unless expressly limited otherwise.

Any process or method descriptions described in flowcharts or otherwise herein may be understood as representing modules, segments or portions of code that include one or more executable instructions for implementing the steps of a particular logic function or process. The scope of the preferred embodiments of the present application includes additional implementations where the functions may not be performed in the order shown or discussed, including according to the functions involved, in substantially simultaneous or in reverse order, which should be understood by those skilled in the art to which the embodiment of the present application belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" may be any device that may contain, store, communicate, propagate, or transport the program for use by or in connection with the instruction execution system, device, or apparatus. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium may even be paper or other suitable medium upon which the program may be printed, as it may be read, for example, by optical scanning of the paper or other medium, followed by editing, interpretation or, where appropriate, process otherwise to electronically obtain the program, which is then stored in a computer memory.

It should be understood that various portions of the present application may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, each of the functional units in the embodiments of the present application may be integrated in one processing module, or each of the units may exist alone physically, or two or more units may be integrated in one module. The above-mentioned integrated module may be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

The foregoing descriptions are merely specific embodiments of the present application, but not intended to limit the protection scope of the present application. Those skilled in the art may easily conceive of various changes or modifications within the technical scope disclosed herein, all these should be covered within the protection scope of the present application. Therefore, the protection scope of the present application should be subject to the protection scope of the claims.

What is claimed is:

1. A lane changing method for a driverless vehicle, comprising:
   determining candidate lanes, to which a lane changing is to be performed, based on a travelling intention of a main vehicle;
   screening the candidate lanes based on lane changing conditions of the candidate lanes;
   selecting, from the screened candidate lanes, a target lane, to which the lane changing of the main vehicle is to be performed;
   determining whether the lane changing of the main vehicle from a current lane to the target lane is safe; and
   performing the lane changing, if the lane changing is determined to be safe;
   wherein the determining whether the lane changing of the main vehicle from the current lane to the target lane is safe comprises:
   performing a single frame trajectory determination according to an acquired single frame, wherein the single frame trajectory determination comprises: determining whether a distance between each obstacle on the target lane, to which the lane changing is to be performed, and the main vehicle is greater than a security distance;
   performing a multi-frame trend determination according to acquired multiple frames, wherein the multi-frame trend determination comprises: determining whether a distance between each obstacle on the target lane and the main vehicle is not reduced; and
   determining that the lane changing is safe, if the distance between each obstacle on the target lane and the main vehicle is greater than the security distance, and the distance between each obstacle on the target lane and the main vehicle is not reduced.

2. The lane changing method according to claim 1, wherein the screening the candidate lanes based on lane changing conditions of the candidate lanes comprises:
   ranking the candidate lanes with a machine learning model, wherein the candidate lanes with high security risk and/or poor trafficability are ranked behind; and
   screening out at least one of the candidate lanes ranked behind,
   wherein a characteristic of the machine learning model comprises: at least one of a kinematic parameter of an obstacle, a kinematic parameter of the main vehicle, a distance between the obstacle and the main vehicle, and a state of the obstacle, and
   wherein the kinematic parameter comprises at least one of a speed and a position; the state of the obstacle comprises at least one of a size of the obstacle, an orientation of the obstacle, and a category of the obstacle; and the category of the obstacle comprises at least one of a long-term stationary category and a short-term stationary category.

3. The lane changing method according to claim 1, wherein the selecting, from the screened candidate lanes, a target lane, to which the lane changing of the main vehicle is to be performed comprises:
   calculating lane changing cost values for each lane of the screened candidate lanes;
   performing a weighted summation on the lane changing cost values for each lane; and
   selecting the target lane, to which the lane changing of the main vehicle is to be performed, based on weighted summation values of the screened candidate lanes,
   wherein the lane changing cost values comprise at least two of a blocking cost value, a reference line cost value, and a lane keeping cost value.

4. The lane changing method according to claim 3, wherein the calculating lane changing cost values for each lane of the screened candidate lanes comprises at least two of:
   determining the blocking cost value according to at least one of a kinematic parameter of an obstacle, a kinematic parameter of the main vehicle, a distance between the obstacle and the main vehicle, and a state of the obstacle, wherein the kinematic parameter comprises at least one of a speed and a position; the state of the obstacle comprises at least one of a size of the obstacle, an orientation of the obstacle, and a category of the obstacle; and the category of the obstacle comprises at least one of a long-term stationary category and a short-term stationary category;
   determining the reference line cost value according to a length of a lane changing section corresponding to a current position of the main vehicle; and determining the lane keeping cost value based on the number of lane changing from the current lane to the candidate lane and/or the travelling intention of the main vehicle.

5. The lane changing method according to claim 3, wherein the performing a weighted summation on the lane changing cost values for each lane comprises:
   adjusting a weight corresponding to each of the lane changing cost values;
   setting the weight corresponding to each of the lane changing cost values according to the adjusted result; and
   performing the weighted summation on the lane changing cost values according to the set weights.

6. The lane changing method according to claim 1, wherein the determining whether a distance between each obstacle on the target lane and the main vehicle is not reduced comprises:
   calculating the distance between each obstacle on the target lane and the main vehicle in each frame of acquired continuous multiple frames, the distance comprising a lateral distance and a longitudinal distance; and
   determining whether the distance is not reduced.

7. The lane changing method according to claim 1, wherein the determining whether a distance between each obstacle on the target lane, to which the lane changing is to be performed, and the main vehicle is greater than a security distance comprises:
   calculating the security distance between each obstacle on the target lane and the main vehicle, the security distance comprising a lateral security distance and a longitudinal security distance; and
   determining that the distance between the obstacle and the main vehicle is greater than the security distance, in a case that the lateral distance between the obstacle and the main vehicle is greater than the lateral security distance, and the longitudinal distance between the obstacle and the main vehicle is greater than the longitudinal security distance.

8. The lane changing method according to claim 1, further comprising:
   re-determining whether the lane changing of the main vehicle from the current lane to the target lane is safe after an acquisition of a next frame, if it is determined that the lane changing is not safe at a current time.

9. The lane changing method according to claim 1, wherein before performing the lane changing, if the lane changing is determined to be safe, the method further comprises:
   adjusting a speed of the main vehicle to adapt the speed of the main vehicle to a speed of an obstacle vehicle on the target lane, in a case that the lane changing is determined to be safe.

10. A lane changing device for a driverless vehicle, comprising:
    one or more processors; and
    a storage device configured to store one or more programs, wherein
    the one or more programs, when executed by the one or more processors, cause the one or more processors to:
    determine candidate lanes, to which a lane changing is to be performed, based on a travelling intention of a main vehicle;
    screen the candidate lanes based on lane changing conditions of the candidate lanes;
    select, from the screened candidate lanes, a target lane, to which the lane changing of the main vehicle is to be performed;
    determine whether the lane changing of the main vehicle from a current lane to the target lane is safe; and
    perform the lane changing, if the lane changing is determined to be safe;
    wherein the one or more programs, when executed by the one or more processors, cause the one or more processors further to:
    perform a single frame trajectory determination according to an acquired single frame, wherein the single frame trajectory determination comprises: determining whether a distance between each obstacle on the target lane, to which the lane changing is to be performed, and the main vehicle is greater than a security distance;
    perform a multi-frame trend determination according to acquired multiple frames, wherein the multi-frame trend determination comprises: determining whether a distance between each obstacle on the target lane and the main vehicle is not reduced; and
    determine that the lane changing is safe, if the distance between each obstacle on the target lane and the main vehicle is greater than the security distance, and the distance between each obstacle on the target lane and the main vehicle is not reduced.

11. The lane changing device according to claim 10, wherein the one or more programs, when executed by the one or more processors, cause the one or more processors further to:
    rank the candidate lanes with a machine learning model, wherein the candidate lanes with high security risk and/or poor trafficability are ranked behind; and
    screen out at least one of the candidate lanes ranked behind,
    wherein a parameter of the machine learning model comprises: at least one of a kinematic parameter of an obstacle, a kinematic parameter of the main vehicle, a distance between the obstacle and the main vehicle, and a state of the obstacle, and
    wherein the kinematic parameter comprises at least one of a speed and a position; the state of the obstacle comprises at least one of a size of the obstacle, an orientation of the obstacle, and a category of the obstacle; and the category of the obstacle comprises at least one of a long-term stationary category and a short-term stationary category.

12. The lane changing device according to claim 10, wherein the one or more programs, when executed by the one or more processors, cause the one or more processors further to:
    calculate lane changing cost values for each lane of the screened candidate lanes;
    perform a weighted summation on the lane changing cost values for each lane; and
    select the target lane, to which the lane changing of the main vehicle is to be performed, based on weighted summation values of the screened candidate lanes,
    wherein the lane changing cost values comprise at least two of a blocking cost value, a reference line cost value, and a lane keeping cost value.

13. The lane changing device according to claim 12, wherein the one or more programs, when executed by the one or more processors, cause the one or more processors further to implement at least two of:
    determining the blocking cost value according to at least one of a kinematic parameter of an obstacle, a kinematic parameter of the main vehicle, a distance between the obstacle and the main vehicle, and a state of the obstacle, wherein the kinematic parameter comprises at least one of a speed and a position; the state of the obstacle comprises at least one of a size of the obstacle, an orientation of the obstacle, and a category of the obstacle; and the category of the obstacle comprises at least one of a long-term stationary category and a short-term stationary category;

determining the reference line cost value according to a length of a lane changing section corresponding to a current position of the main vehicle; and determining the lane keeping cost value based on the number of lane changing from the current lane to the candidate lane and/or the travelling intention of the main vehicle.

14. The lane changing device according to claim 12, wherein the one or more programs, when executed by the one or more processors, cause the one or more processors further to:

adjust a weight corresponding to each of the lane changing cost values;

set the weight corresponding to each of the lane changing cost values according to the adjusted result; and perform the weighted summation on the lane changing cost values according to the set weights.

15. The lane changing device according to claim 10, wherein the one or more programs, when executed by the one or more processors, cause the one or more processors further to:

calculate the distance between each obstacle on the target lane and the main vehicle in each frame of acquired continuous multiple frames, the distance comprising a lateral distance and a longitudinal distance; and determine whether the distance is not reduced.

16. The lane changing device according to claim 10, wherein the one or more programs, when executed by the one or more processors, cause the one or more processors further to:

calculate the security distance between each obstacle on the target lane and the main vehicle, the security distance comprising a lateral security distance and a longitudinal security distance; and determine that the distance between the obstacle and the main vehicle is greater than the security distance, in a case that the lateral distance between the obstacle and the main vehicle is greater than the lateral security distance, and the longitudinal distance between the obstacle and the main vehicle is greater than the longitudinal security distance.

17. The lane changing device according to claim 10, wherein the one or more programs, when executed by the one or more processors, cause the one or more processors further to:

re-determine whether the lane changing of the main vehicle from the current lane to the target lane is safe after an acquisition of a next frame, if it is determined that the lane changing is not safe at a current time.

18. The lane changing device according to claim 10, wherein the one or more programs, when executed by the one or more processors, cause the one or more processors further to:

adjust a speed of the main vehicle to adapt the speed of the main vehicle to a speed of an obstacle vehicle on the target lane, in a case that the lane changing is determined to be safe.

19. A non-transitory computer-readable storage medium storing computer instructions, the computer instructions, when executed by a computer, cause the computer perform operations of:

determining candidate lanes, to which a lane changing is to be performed, based on a travelling intention of a main vehicle;

screening the candidate lanes based on lane changing conditions of the candidate lanes;

selecting, from the screened candidate lanes, a target lane, to which the lane changing of the main vehicle is to be performed;

determining whether the lane changing of the main vehicle from a current lane to the target lane is safe; and performing the lane changing, if the lane changing is determined to be safe;

wherein the determining whether the lane changing of the main vehicle from the current lane to the target lane is safe comprises:

performing a single frame trajectory determination according to an acquired single frame, wherein the single frame trajectory determination comprises: determining whether a distance between each obstacle on the target lane, to which the lane changing is to be performed, and the main vehicle is greater than a security distance;

performing a multi-frame trend determination according to acquired multiple frames, wherein the multi-frame trend determination comprises: determining whether a distance between each obstacle on the target lane and the main vehicle is not reduced; and determining that the lane changing is safe, if the distance between each obstacle on the target lane and the main vehicle is greater than the security distance, and the distance between each obstacle on the target lane and the main vehicle is not reduced.

* * * * *